(12) United States Patent
Hoshi

(10) Patent No.: US 7,957,414 B2
(45) Date of Patent: Jun. 7, 2011

(54) TRANSMITTING APPARATUS AND TRANSMISSION RATE CONTROL METHOD

(75) Inventor: Rika Hoshi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 156 days.

(21) Appl. No.: 12/302,696

(22) PCT Filed: May 11, 2007

(86) PCT No.: PCT/JP2007/059705
§ 371 (c)(1),
(2), (4) Date: Nov. 26, 2008

(87) PCT Pub. No.: WO2007/138833
PCT Pub. Date: Dec. 6, 2007

(65) Prior Publication Data
US 2009/0147800 A1     Jun. 11, 2009

(30) Foreign Application Priority Data

May 29, 2006    (JP) ................................. 2006-148840

(51) Int. Cl.
*H04J 3/16* (2006.01)
(52) U.S. Cl. ...................................................... 370/465
(58) Field of Classification Search .................. 370/229, 370/310, 464, 465, 468, 395.54
See application file for complete search history.

(56) References Cited

U.S. PATENT DOCUMENTS

| | | | |
|---|---|---|---|
| 5,005,171 A | 4/1991 | Modisette, Jr. et al. | |
| 6,226,299 B1 | 5/2001 | Henson | |
| 6,266,346 B1 * | 7/2001 | Takeda et al. | 370/468 |
| 6,400,731 B1 * | 6/2002 | Nitta | 370/468 |
| 6,975,420 B2 | 12/2005 | Tajiri et al. | |
| 7,133,407 B2 * | 11/2006 | Jinzaki et al. | 370/395.64 |
| 7,327,782 B2 * | 2/2008 | Min | 375/222 |
| 7,746,906 B2 * | 6/2010 | Jinzaki et al. | 370/503 |
| 2004/0083488 A1 * | 4/2004 | Fukuda et al. | 725/38 |
| 2004/0085945 A1 * | 5/2004 | Takabatake et al. | 370/338 |
| 2004/0223477 A1 * | 11/2004 | Iwasaki et al. | 370/338 |
| 2005/0105504 A1 * | 5/2005 | Sakoda | 370/349 |
| 2005/0147106 A1 * | 7/2005 | Sonoda | 370/395.51 |
| 2005/0166123 A1 * | 7/2005 | Yanamoto et al. | 714/776 |
| 2005/0286484 A1 * | 12/2005 | Nakao et al. | 370/349 |

(Continued)

FOREIGN PATENT DOCUMENTS

EP            1185072 A2      3/2002
(Continued)

OTHER PUBLICATIONS

European search report dated Jul. 22, 2010 for corresponding European application 07743140.1 lists the references above.

*Primary Examiner* — Chi H Pham
*Assistant Examiner* — Robert Lopata
(74) *Attorney, Agent, or Firm* — DLA Piper LLP (US)

(57) ABSTRACT

A wireless communication apparatus (10) includes: a transmission data acquisition unit (21) that acquires transmission data; a control data judging unit (24) that judges whether or not the acquired transmission data is control data for causing an apparatus that receives the transmission data to perform a predetermined communication control process; and a transmission rate control unit (33) that controls a transmission rate of the transmission data according to a judgment result of the control data judging unit (24).

10 Claims, 4 Drawing Sheets

U.S. PATENT DOCUMENTS

| | | | |
|---|---|---|---|
| 2007/0230396 A1* | 10/2007 | Watanabe | 370/329 |
| 2008/0095184 A1* | 4/2008 | Yashima et al. | 370/450 |
| 2009/0275337 A1* | 11/2009 | Maeda et al. | 455/442 |
| 2009/0300231 A1* | 12/2009 | Munetsugu | 710/33 |
| 2010/0005166 A1* | 1/2010 | Chung | 709/224 |
| 2010/0142493 A1* | 6/2010 | Sakoda et al. | 370/336 |

FOREIGN PATENT DOCUMENTS

| | | |
|---|---|---|
| JP | 11-017919 | 1/1999 |
| JP | 2004-349884 | 12/2004 |
| JP | 2005-210211 | 8/2005 |
| WO | 0079359 A2 | 12/2000 |

* cited by examiner

TRANSMITTING APPARATUS AND TRANSMISSION RATE CONTROL METHOD

TECHNICAL FIELD

The present invention relates to a transmitting apparatus and a transmission rate control method, and more particularly, to a technology of suppressing occurrence of an error in control data.

BACKGROUND ART

In communication systems employing an adaptive modulation schemer as the communication state becomes better, the communication rate becomes higher. However, a modulation scheme realizing a high communication rate is likely to be affected by noise and interference, and the error occurrence rate is increased depending on the state of the noise and interference.

Therefore, in technologies described in Patent Document 1 and Patent Document 2, when data is resent because an error occurred in data transmission, the communication rate is set lower than that in an initial transmission. This is performed in order to lower the error occurrence rate than that in the initial transmission, thereby reliably sending the retransmission data.

Patent Document 1: JP 2004-349884 A
Patent Document 2: JP 11-17919 A

DISCLOSURE OF THE INVENTION

Problems to be Solved by the Invention

However, in the technologies described in respective Patent Documents described above, there may be a case where retransmission is not even performed.

Specifically, in a retransmission process, a receiving apparatus which has received the sent data judges whether or not an error is contained in the received data, and sends a retransmission request when an error is contained in the received data. Upon reception of the retransmission request, the transmitting apparatus resends the data. However, an error may even occur in the retransmission request. In this case, the transmitting apparatus cannot even start the retransmission process for the data.

This circumstance may occur not only in the retransmission request but also in other control data. In other words, when an error occurs in control data, the communication control process corresponding to the control data is not performed at all. When the error thus occurs in the control data, the communication control process is greatly affected. Therefore, it is desired that the occurrence of the error in the control data be suppressed as much as possible.

Therefore, an object of the present invention is to provide a transmitting apparatus and a transmission rate control method which are capable of particularly suppressing the occurrence of an error in control data.

In order to solve the above-mentioned problem, a transmitting apparatus according to the present invention includes: a transmission data acquisition unit acquiring transmission data; a judging unit judging whether or not the transmission data is control data for causing an apparatus that receives the transmission data to perform a predetermined communication control process; and a transmission rate control unit controlling a transmission rate of the transmission data according to a judgment result of the judging unit.

According to this, the transmission rate of the control data can be lowered, and hence the occurrence of an error in the control data can be particularly suppressed.

Moreover, the transmitting apparatus described above further includes a transmission frame generation unit generating a transmission frame based on the transmission data. The transmission rate control unit may control the transmission rate of the transmission frame generated by the transmission frame generation unit, depending on whether or not transmission data judged to be the control data by the judging unit is contained in the transmission frame.

According to this, the transmission rate of the transmission frame that contains the control data can be lowered, and hence the occurrence of an error in the control data can be particularly suppressed.

Further, in the transmitting apparatus described above, the transmission frame generation unit may incorporate predetermined control information in the transmission frame to be generated, depending on whether or not the transmission data judged to be the control data by the judging unit is contained in the transmission frame, and the transmission rate control unit may control the transmission rate of the transmission frame generated by the transmission frame generation unit, depending on whether or not the predetermined control information is contained in the transmission frame.

The transmission frame generation unit corresponds to a function in a layer 3. On the other hand, the transmission rate control unit corresponds to a function in a layer 2. According to the transmitting apparatus described above, control information can be incorporated in a header of a layer 3 frame generated by the transmission frame generation unit, and hence whether or not control data is contained in the layer 3 frame can be judged in the layer 2 by referring to the control information.

Further, in each transmitting apparatus described above, the transmission frame generation unit may control an amount of the transmission data to be incorporated in the transmission frame to be generated, depending on whether or not the transmission data judged to be the control data by the judging unit is contained in the transmission frame.

For example, when the transmission rate is lowered, the amount of data in a transmission frame is reduced. According to the transmitting apparatus described above, the amount of transmission data to be incorporated in the transmission frame to be generated can be controlled depending on whether or not control data is contained in the transmission frame, and hence the amount of data in the transmission frame can be controlled in conjunction with the transmission rate.

Further, a transmission rate control method according to the present invention includes: a transmission data acquiring step of acquiring transmission data; a judging step of judging whether or not the transmission data is control data for causing an apparatus that receives the transmission signal to perform a predetermined communication control process; and a transmission rate control step of controlling a transmission rate of the transmission data according to the judgment result.

BEST MODE FOR CARRYING OUT THE INVENTION

An embodiment of the present invention is described with reference to the drawings.

Figure 1:
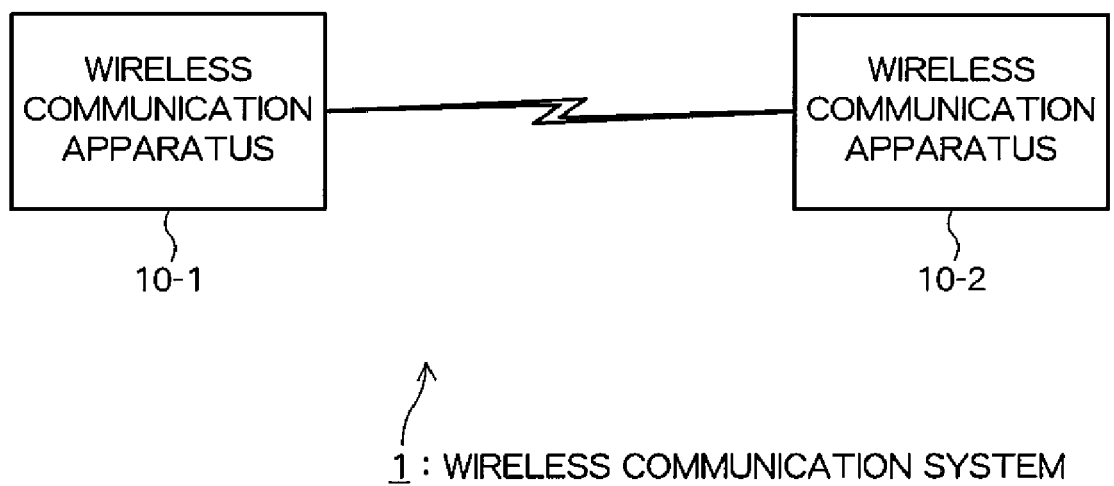
FIG. 1 is a diagram illustrating a system configuration of a wireless communication system according to an embodiment of the present invention.

FIG. 1 is a diagram illustrating a system configuration of a wireless communication system 1 according to this embodiment. As illustrated in FIG. 1, the wireless communication system 1 includes a plurality of wireless communication apparatuses 10. In a concrete example, the wireless communication system 1 is a mobile communication system, and the wireless communication apparatuses 10 are each used as a base station apparatus or a mobile station apparatus.

Each of the wireless communication apparatuses 10 includes a CPU and a memory to function as a computer. The CPU is a processing unit that executes a program stored in the memory, controls each unit included in the respective apparatuses, and realizes respective functions to be described later. The memory stores data and the program to implement this embodiment. The memory also serves as a working memory for the CPU.

The wireless communication apparatuses 10 each perform wireless communications therebetween while controlling the communication rate through high-speed adaptive modulation. In the high-speed adaptive modulation, transmission data is divided into a fixed-modulation part and an adaptive-modulation part. In the fixed-modulation part, modulation scheme information indicating a modulation scheme to be used for the adaptive-modulation part is incorporated. The transmitting-side wireless communication apparatus 10 modulates the fixed-modulation part by a predetermined modulation scheme and modulates the adaptive-modulation part by the modulation scheme indicated by the modulation scheme information, thereby generating a wireless signal. The receiving-side wireless communication apparatus 10 first demodulates the received wireless signal by the predetermined modulation scheme. The receiving-side wireless communication apparatus 10 obtains the modulation scheme information through the demodulation and demodulates the adaptive-modulation part by the modulation scheme indicated by the modulation scheme information.

In general, a modulation scheme that realizes a higher communication rate is likely to be affected by noise and interference. Transmission data contains control data and communication data. It is strongly demanded that the control data can be more reliably demodulated than the communication data. Therefore, in this embodiment, a modulation scheme to be used for the adaptive-modulation part is controlled depending on whether or not the control data is contained in the adaptive-modulation part, thereby reliably demodulating the control data. Hereinafter, a detailed description is given.

Figure 2:
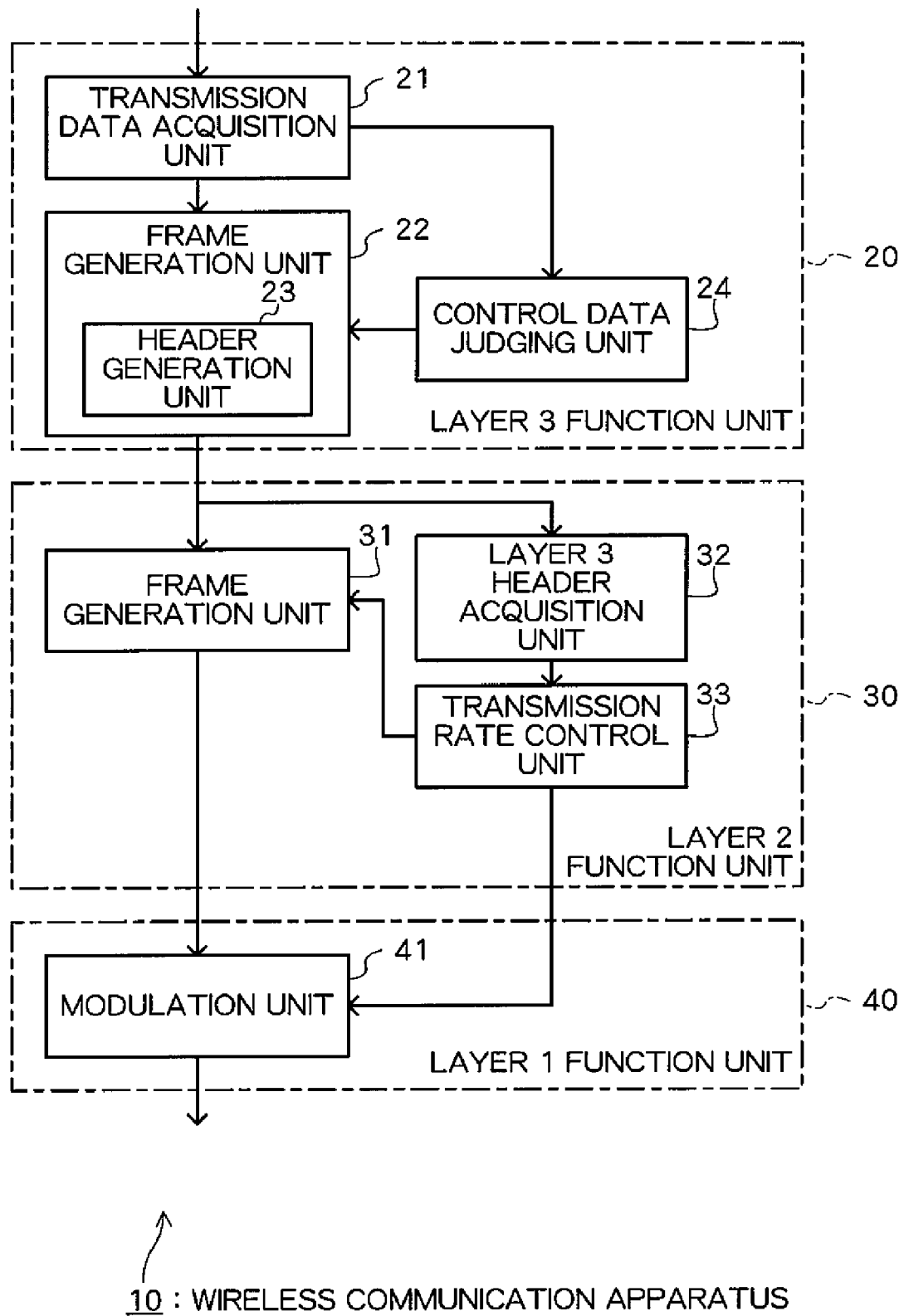
FIG. 2 is a diagram illustrating a functional block of a wireless communication apparatus according to the embodiment of the present invention.

FIG. 2 is a diagram illustrating a functional block of the transmission function of the wireless communication apparatus 10. As illustrated in FIG. 2, the wireless communication apparatus 10 includes a layer 3 function unit 20, a layer 2 function unit 30, and a layer 1 function unit 40.

The layer 3 function unit 20 includes a transmission data acquisition unit 21, a frame generation unit 22, and a control data judging unit 24. The frame generation unit 22 includes a header generation unit 23. The layer 2 function unit 30 includes a frame generation unit 31, a layer 3 header acquisition unit 32, and a transmission rate control unit 33. The layer 1 function unit 40 includes a modulation unit 41.

The transmission data acquisition unit 21 sequentially obtains transmission data from a higher layer (not shown) and outputs the transmission data to the frame generation unit 22 and the control data judging unit 24. The obtained transmission data is any one of communication data indicating the communication content and control data, such as a retransmission request, for causing an apparatus that receives the transmission data to perform a predetermined communication control process.

The control data judging unit 24 sequentially judges whether or not the transmission data sequentially obtained by the transmission data acquisition unit 21 is control data.

The frame generation unit 22 generates a layer 3 frame based on the transmission data input from the transmission data acquisition unit 21 and outputs the layer 3 frame to the layer 2 function unit 30. The header generation unit 23 generates a layer 3 header and incorporates the layer 3 header in the layer 3 frame to be generated.

Figure 3:
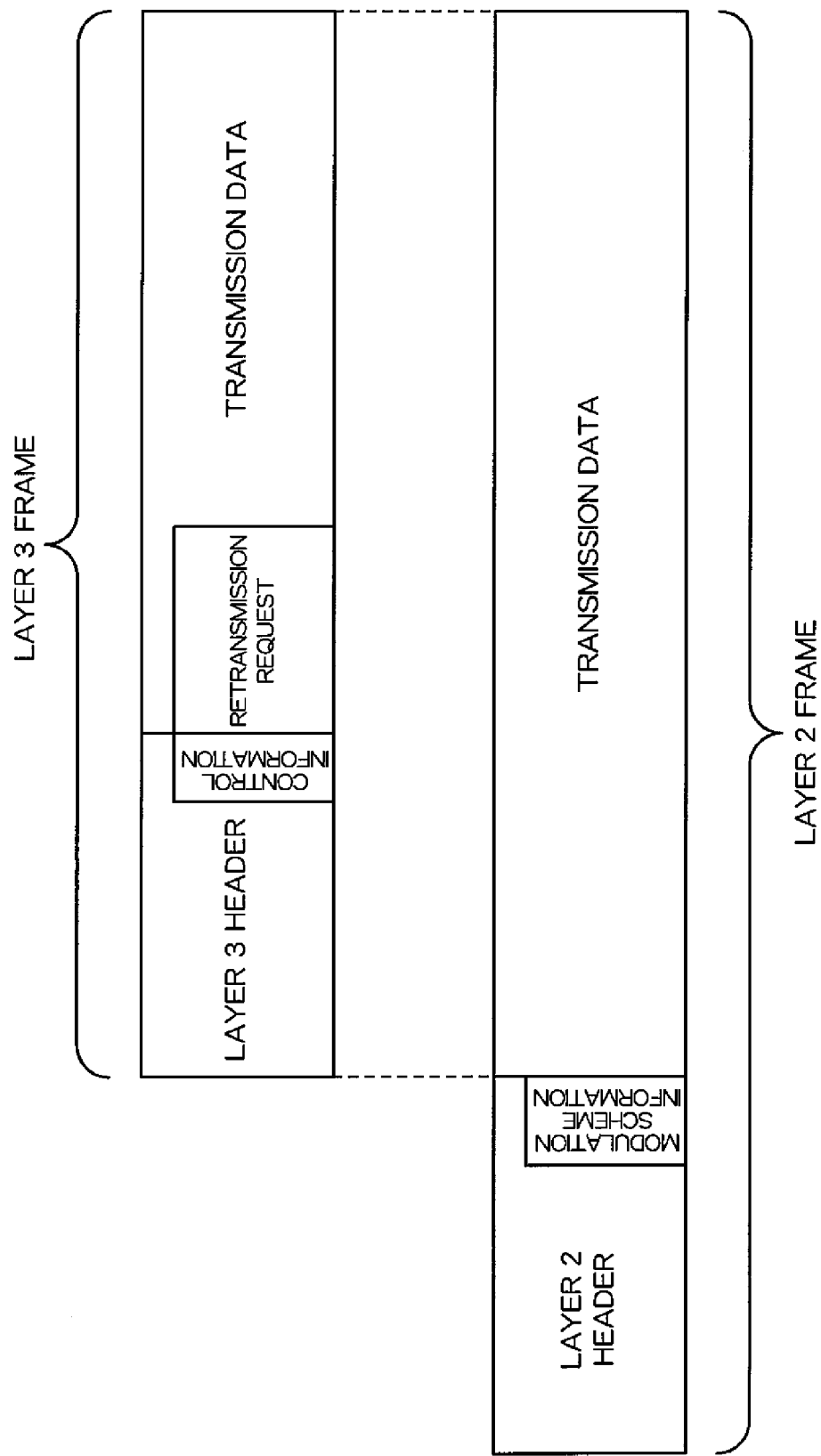
FIG. 3 is a diagram illustrating a layer 3 frame and a layer 2 frame according to the embodiment of the present invention.

FIG. 3 illustrates an example of the layer 3 frame generated by the frame generation unit 22. As illustrated in FIG. 3, the layer 3 frame contains the layer 3 header and the transmission data. Control data such as a retransmission request can be contained in part of or in the entire transmission data, as illustrated in FIG. 3.

The header generation unit 23 incorporates predetermined control information in the layer 3 header, depending on whether or not transmission data which has been judged to be control data by the control data judging unit 24 is contained in a layer 3 frame to be generated. Specifically, the header generation unit 23 specifies 1 ("1" corresponds to the predetermined control information) as the value of a one-bit predetermined field provided in the layer 3 header of a layer 3 frame that contains transmission data which has been judged to be control data by the control data judging unit 24. On the other hand, the header generation unit 23 specifies 0 as the value of the predetermined field for a layer 3 frame that does not contain transmission data which has been judged to be control data by the control data judging unit 24.

Depending on whether or not transmission data which has been judged to be control data by the control data judging unit 24 is contained in a layer 3 frame to be generated, the frame generation unit 22 controls the amount of transmission data to be incorporated in the layer 3 frame.

Specifically, the transmission rate control unit 33, to be described later, controls the transmission rate depending on whether or not the predetermined control information is contained in the layer 3 header. Since the layer 3 frame has a fixed temporal length, as the transmission rate becomes lower, the amount of transmission data which can be incorporated in one layer 3 frame becomes smaller.

Therefore, the frame generation unit 22 first predicts the transmission rate to be determined as a result of the control performed by the transmission rate control unit 33. Specifically, the frame generation unit 22 performs the same processing as that of the transmission rate control unit 33 to obtain a transmission rate which would be determined by the transmission rate control unit 33. The frame generation unit 22 obtains the amount of transmission data which can be incorporated in the layer 3 frame, based on the result of the obtainment. Then, the frame generation unit 22 controls the amount of transmission data to be incorporated in the layer 3 frame, according to the obtained amount of transmission data. As a result, the frame generation unit 22 generates the layer 3 frame which contains the obtained amount of transmission data.

The frame generation unit 31 obtains the layer 3 frame input from the frame generation unit 22 to the layer 2 function unit 30. The frame generation unit 31 adds a layer 2 header (to be described in detail later) to the layer 3 frame and outputs the layer 3 frame, to which the layer 2 header has been added, to the layer 1 function unit 40.

The layer 3 header acquisition unit 32 also obtains the layer 3 frame input from the frame generation unit 22 to the layer 2 function unit 30. Then, the layer 3 header acquisition unit 32 reads the layer 3 header from the obtained layer 3 frame and outputs the layer 3 header to the transmission rate control unit 33.

The transmission rate control unit 33 controls the transmission rate of transmission data according to a judgment result of the control data judging unit 24. Specifically, depending on whether or not transmission data which has been judged to be control data by the control data judging unit 24 is contained in the layer 3 frame generated by the frame generation unit 22, the transmission rate control unit 33 controls the transmission rate of the layer 3 frame. More specifically, depending on whether or not the predetermined control information is contained in the layer 3 header input from the layer 3 header acquisition unit 32, the transmission rate control unit 33 controls the transmission rate of the layer 3 frame that contains the layer 3 header. Still more specifically, the transmission rate control unit 33 refers to the value of the predetermined field in the layer 3 header input from the layer 3 header acquisition unit 32. When the value of the predetermined field is "0", the transmission rate control unit 33 controls the transmission rate based on the reception quality, on the receiving side, of a wireless signal sent in the past by this wireless communication apparatus 10. On the other hand, when the value of the predetermined field is "1", the transmission rate control unit 33 sets the transmission rate to a predetermined fixed value which is relatively low.

The transmission rate control unit 33 stores a transmission-rate and modulation-method associating table which associates a transmission rate with modulation scheme information indicating a modulation scheme used to realize the transmission rate. The transmission rate control unit 33 reads modulation scheme information stored in association with the transmission rate determined as a result of the above-mentioned control, from the transmission-rate and modulation-method associating table, and outputs the modulation scheme information to the frame generation unit 31 and the modulation unit 41.

The frame generation unit 31 generates a layer 2 header as described above, and incorporates the modulation scheme information input from the transmission rate control unit 33 in this layer 2 header.

FIG. 3 also illustrates the layer 2 frame generated by the frame generation unit 31. As illustrated in FIG. 3, the layer 2 frame contains the layer 3 frame as transmission data and further contains the layer 2 header. The layer 2 header contains the modulation scheme information as illustrated in FIG. 3.

The modulation unit 41 obtains the layer 2 frame input from the frame generation unit 31 to the layer 1 function unit 40. The modulation unit 41 modulates the fixed-modulation part of the obtained layer 2 frame by the predetermined modulation scheme. The modulation unit 41 also modulates the adaptive-modulation part by the modulation scheme indicated by the modulation scheme information input from the transmission rate control unit 33. The layer 1 function unit 40 sends a wireless signal obtained as a result of the modulation to a wireless zone.

The above-mentioned process is described in more detail with reference to process flows of the wireless communication apparatus 10. A case where control data is a retransmission request is described.

Figure 4:
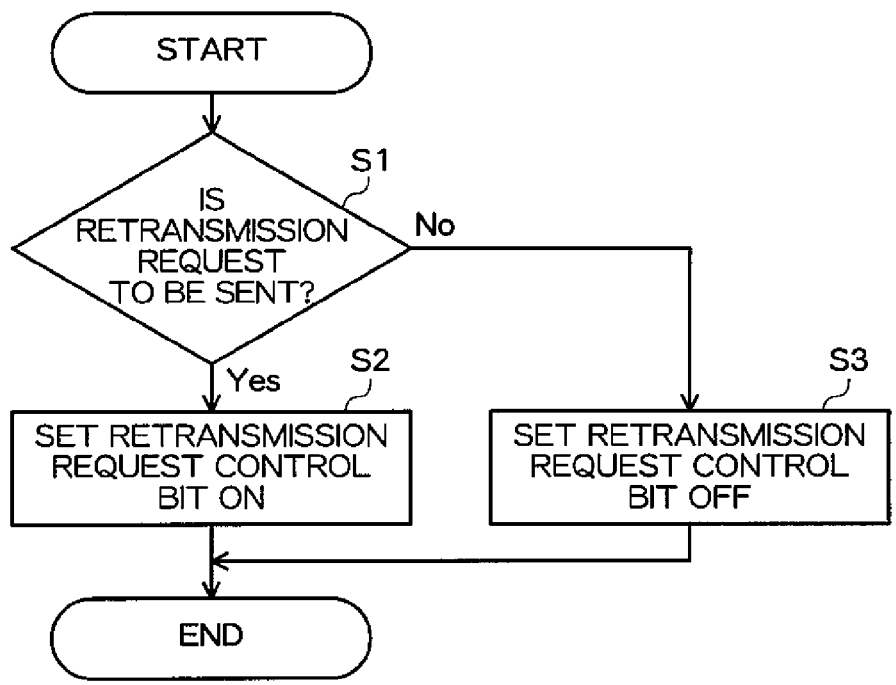
FIG. 4 is a diagram illustrating a process flow of the wireless communication apparatus according to the embodiment of the present invention.

FIG. 4 is a diagram illustrating a process flow about a process of the layer 3 function unit 20. As illustrated in FIG. 4, the layer 3 function unit 20 judges whether or not a retransmission request is to be sent (S1). When a retransmission request is to be sent, the layer 3 function unit 20 sets ON are transmission request control bit in a layer 3 frame to be generated (S2). Specifically, the value of the predetermined field is set to 1. On the other hand, when a retransmission request is not to be sent, the layer 3 function unit 20 sets OFF the retransmission request control bit in the layer 3 frame to be generated (S3). Specifically, the value of the predetermined field is set to 0.

Figure 5:
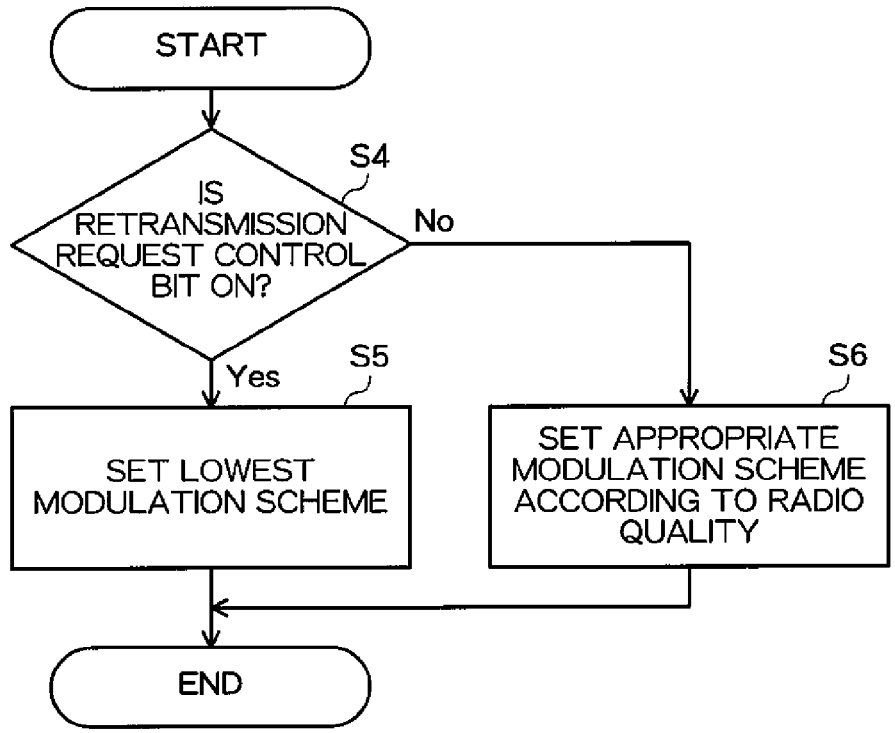
FIG. 5 is a diagram illustrating a process flow of the wireless communication apparatus according to the embodiment of the present invention.

FIG. 5 is a diagram illustrating a process flow about a process of the layer 2 function unit 30. As illustrated in FIG. 5, the layer 2 function unit 30 judges whether or not the retransmission request control bit is ON in the input layer 3 frame (S4). When the retransmission request control bit is ON, the layer 2 function unit 30 determines, among available modulation schemes, a modulation scheme that realizes the lowest transmission rate, as a modulation scheme to be used by the modulation unit 41 (S5). On the other hand, when the retransmission request control bit is OFF, the layer 2 function unit 30 selects and determines an appropriate modulation scheme according to the radio quality, as a modulation scheme to be used by the modulation unit 41 (S6).

As described above, according to the wireless communication apparatus 10, the transmission rate of control data can be lowered, and hence the occurrence of an error in the control data can be particularly suppressed. Further, since the transmission rate of a transmission frame that contains control data can be lowered, the occurrence of an error in the control data can be particularly suppressed.

Further, according to the wireless communication apparatus 10, control information can be incorporated in the layer 3 header, and hence the layer 2 function unit 30 can judge whether or not control data is contained in the layer 3 frame by referring to the control information.

Further, according to the wireless communication apparatus 10, the amount of transmission data to be incorporated in a layer 3 frame can be controlled depending on whether or not control data is contained in the layer 3 frame, and hence the amount of data in the layer 3 frame can be controlled in conjunction with the transmission rate.

Note that the present invention is not limited to the above-mentioned embodiment. For example, the present invention may include the following example.

Specifically, a transmitting apparatus monitors whether or not control data that contains a retransmission request has been generated, while usually controlling the transmission rate without distinguishing between control data and communication data. Only when control data that contains a retransmission request is detected, the transmission rate is controlled depending on whether or not the control data is contained in a frame, as described in this embodiment.

In that case, it is preferred that the transmission rate control processing be returned to the processing of controlling the transmission rate without distinguishing between control data and communication data, for example, when a predetermined period of time has elapsed since control data that contains a retransmission request was detected last time, when a predetermined number of frames have been sent since control data that contains a retransmission request was detected last time, or when specific control data other than a retransmission request has been sent.

The invention claimed is:

1. A transmitting apparatus, comprising:
   a transmission data acquisition unit acquiring transmission data;
   a judging unit judging whether the transmission data includes control data instructing to perform a predetermined communication control process in a receiving apparatus of the transmission data; and
   a transmission rate control unit controlling a transmission rate of the transmission data according to a judgment result of the judging unit,
   wherein each of the units are stored in a computer readable medium and executed by a processor.

2. The transmitting apparatus according to claim 1, further comprising a transmission frame generation unit generating a transmission frame based on the transmission data,
   wherein the transmission rate control unit controls the transmission rate of the transmission frame generated by the transmission frame generation unit, depending on whether or not transmission data judged to be the control data by the judging unit is contained in the transmission frame.

3. The transmitting apparatus according to claim 2, wherein:
   the transmission frame generation unit incorporates predetermined control information in the transmission frame to be generated, depending on whether or not the transmission data judged to be the control data by the judging unit is contained in the transmission frame; and
   the transmission rate control unit controls the transmission rate of the transmission frame generated by the transmission frame generation unit, depending on whether or not the predetermined control information is contained in the transmission frame.

4. The transmitting apparatus according to claim 2 or 3, wherein the transmission frame generation unit controls an amount of the transmission data to be incorporated in the transmission frame to be generated, depending on whether the transmission data includes the control data by the judging unit is contained in the transmission frame.

5. A transmission rate control method embedded in a computer readable medium and executed on a processor, comprising:
   a transmission data acquiring step of acquiring transmission data;
   a judging step of judging whether the transmission data includes control data instructing to perform a predetermined communication control process in a receiving apparatus of the transmission data; and
   a transmission rate control step of controlling a transmission rate of the transmission data according to the judgment result.

6. The transmitting apparatus according to claim 1, wherein:
   the predetermined communication control process is a retransmission request to be performed in the receiving apparatus of the transmission data.

7. The transmitting apparatus according to claim 6, wherein:
   the transmission rate control unit controls a first transmission rate of the transmission data when the retransmission request is judged by the judging unit as present in the transmission frame and controls a second transmission rate of the transmission data when the transmission data is judged by the judging unit as absent in the transmission frame, wherein the first transmission rate is lower than the second transmission rate.

8. The transmitting apparatus according to claim 7, wherein:
   the second transmission rate is based on a reception quality.

9. The transmitting apparatus according to claim 2, wherein:
   the predetermined communication control process is a retransmission request to be performed in the receiving apparatus of the transmission data.

10. The transmitting apparatus according to claim 9, wherein:
    the transmission frame generation unit generates a first amount of the transmission data when the retransmission request is judged by the judging unit as present in the transmission frame and generates a second amount of the transmission data when the retransmission request is judged by the judging unit as absent in the transmission frame, wherein the first amount of transmission data is less than the second amount of transmission data.

* * * * *